April 6, 1926. 1,579,561

A. E. MOORHEAD

MOLDING MACHINE AND METHOD OF MOLDING

Original Filed Nov. 3, 1921 4 Sheets-Sheet 1

WITNESS
H. Sherburne

INVENTOR
Albert E. Moorhead
BY
White Prost & Evans
his ATTORNEYS

April 6, 1926. 1,579,561
A. E. MOORHEAD
MOLDING MACHINE AND METHOD OF MOLDING
Original Filed Nov. 3, 1921   4 Sheets-Sheet 2

Fig. 2.

WITNESS
H. Sherburne

INVENTOR
Albert E. Moorhead
BY
White Prost & Evans
his ATTORNEYS

April 6, 1926.

A. E. MOORHEAD 1,579,561

MOLDING MACHINE AND METHOD OF MOLDING

Original Filed Nov. 3, 1921    4 Sheets-Sheet 3

WITNESS
H. Sherburne

INVENTOR
Albert E. Moorhead
BY
White Prat Evans
his ATTORNEYS

Patented Apr. 6, 1926.

1,579,561

UNITED STATES PATENT OFFICE.

ALBERT E. MOORHEAD, OF OAKLAND, CALIFORNIA.

MOLDING MACHINE AND METHOD OF MOLDING.

Application filed November 3, 1921, Serial No. 512,680. Renewed May 31, 1923.

*To all whom it may concern:*

Be it known that I, ALBERT E. MOORHEAD, a citizen of the United States, and a resident of Oakland, in the county of Alameda and State of California, have invented a new and useful Molding Machine and Methods of Molding, of which the following is a specification.

This invention relates to a machine for molding articles from plastic material, such as cement or concrete and more particularly to a machine for rendering the product homogeneous, of good density and non-porous.

It is one of the objects of my invention to make it possible to cast a number of articles simultaneously with a single machine out of plastic material such as wet concrete, and to insure that the products will be homogeneous and free from air holes. Another object of my invention is to cast articles out of plastic material while this material is subjected to a force tending to make the material homogeneous and dense. This force is most conveniently a centrifugal force, created by the planetary movement of the molds about a common center. In addition to this, it may be advisable to subject the molds to rapid vibration for securing still greater homogeneity and density.

The invention possesses other advantageous features, some of which, with the foregoing, will be set forth at length in the following description where there will be outlined in full that form of the invention selected for illustration in the drawings accompanying and forming part of the present specification. In the drawings, I have shown one embodiment of my invention, but it is to be understood that I do not limit myself to such forms, since the invention, as expressed in the claims, may be embodied in other forms as well.

Referring to the drawings.

In the present instance, I have shown my invention as embodied in a machine for casting concrete pipe. A plurality of molds 11, in the present instance twenty, are uniformly spaced about a common center. A planetary motion of these molds 11, is effected during the process of pouring so that centrifugal force may act to make the concrete homogeneous and to force the excess moisture out of it. For this purpose, these molds may be supported upon a rotatably mounted drum 12 made up of two end heads 13, 14 and the sheet metal cylinders 15. The axis of the drum is preferably horizontal so as to minimize the effect of gravity with plastic material during the process of molding. Appropriate means, such as the rivets 16, are used to fasten the cylinder to the heads. Each of these heads 13, 14 also has an integrally formed flange 17 to which are attached appropriate hollow journal supports 18—19 for the drum 12. The journals proper comprise sleeves 20 slipped over the journal supports 18—19. The bearing surface is intentionally made large in diameter the better to support the load of the drum 11.

Bearing standards 21 resting on a part of the foundation, support rollers 22 in any appropriate fashion to form roller bearings for the journals. These rollers 22 are rotatably mounted upon shafts 23, and lubricant, such as grease, is arranged to be supplied to the bearing surface of these shafts by means of the cups 24. To rotate the entire drum 12 together with the associated molds 11, a spur gear 25 is securely fastened to the head 14. This gear is arranged to be driven from any appropriate source of power.

Figure 2:
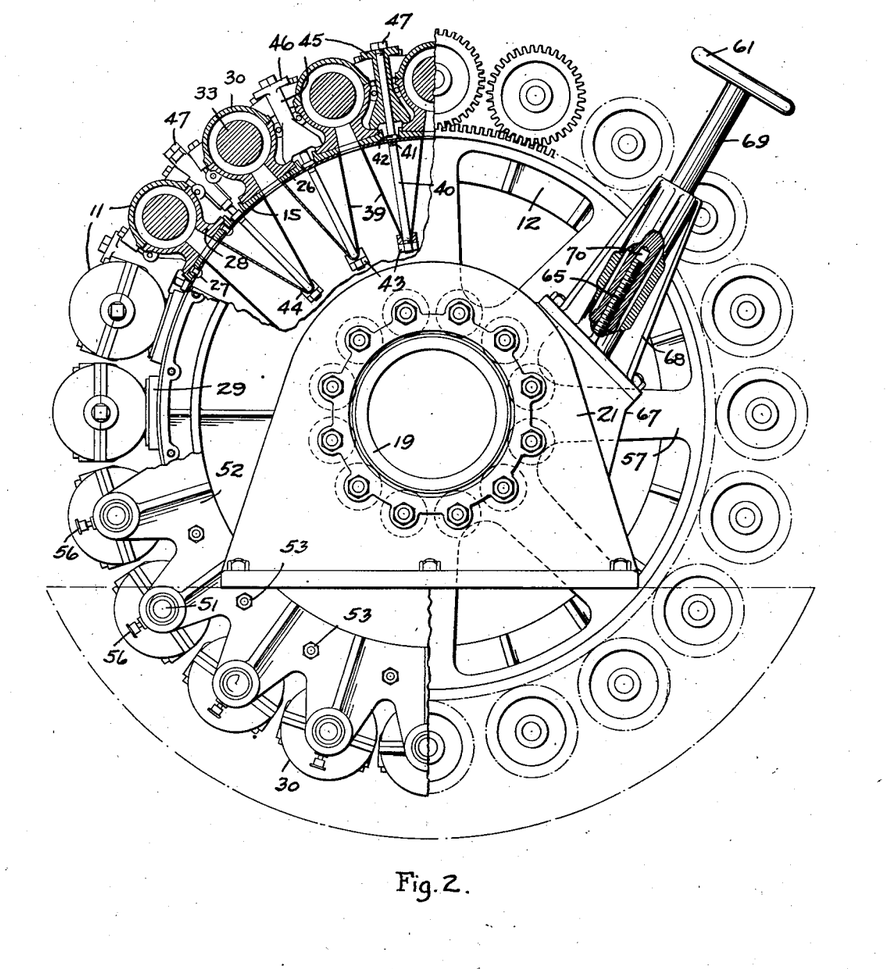
Fig. 2 is a front view, partly in section and partly diagrammatic, of the apparatus.
Figure 3:
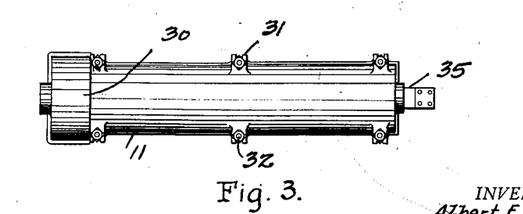
Fig. 3 is a top view of one of the individual molds.

The molds 11 are supported in guides 26, one for each mold. These guides are supported on the periphery of the drum 12, as by means of the rivets 27 (Fig. 2), and extend substantially the entire length of the drum. Each of the guides has a depression or hollow within which the base 28 of the mold 11 fits, and this hollow is formed with the ribs 29 all around the outer edge of the guides. The base 28 of the molds 11 forms the lower half of the mold, and is preferably made from a casting. The upper half 30 of the molds is also preferably made from a casting. Means for fastening the upper and lower halves together may take the form of the lugs 31 on the upper halves and the bolts 32 engaging therewith carried by the lower half 28. Where piping is the article manufactured, a properly formed core 33 is used within the mold 11, so that the pipe has an inside diameter which remains uniform and independent of the amount and density of the plastic material needed for the pipe.

Figure 1:
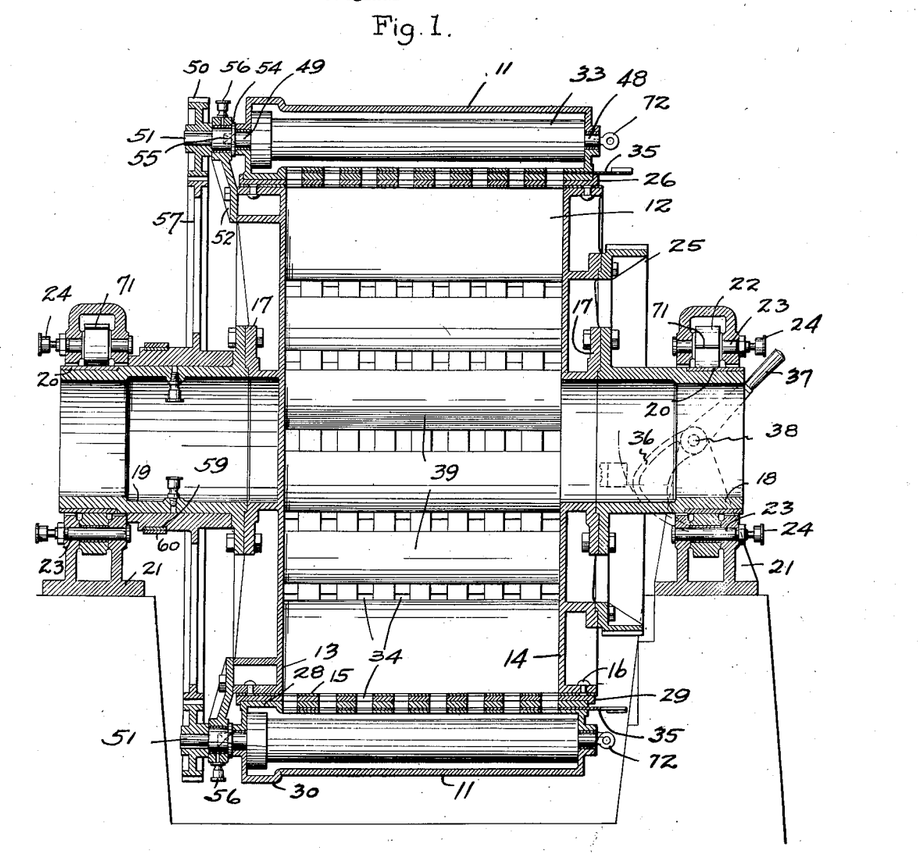
Figure 1 is a longitudinal sectional view of a complete apparatus embodying my invention.
Figures 4, 5:
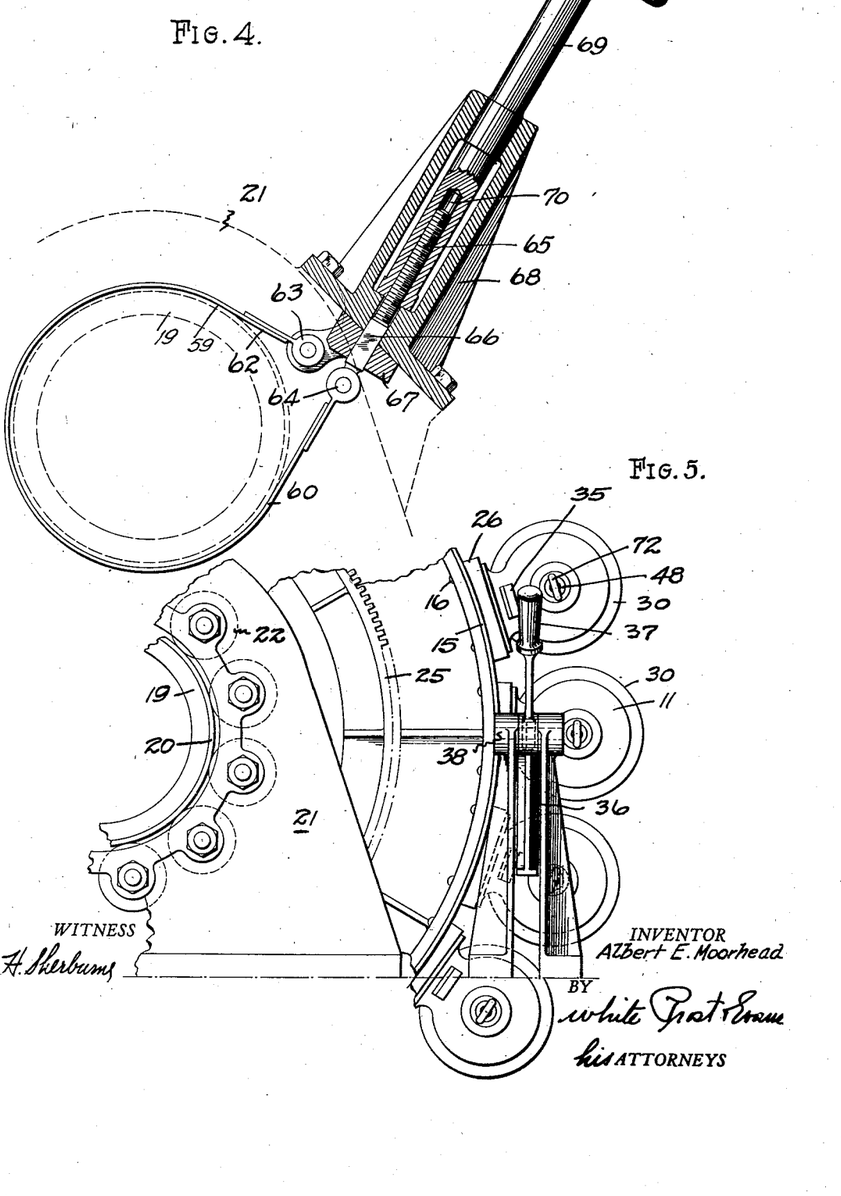
Fig. 4 is an enlarged view of the brake construction.
Fig. 5 is a fractional back view, showing one feature of the construction.
Figure 6:
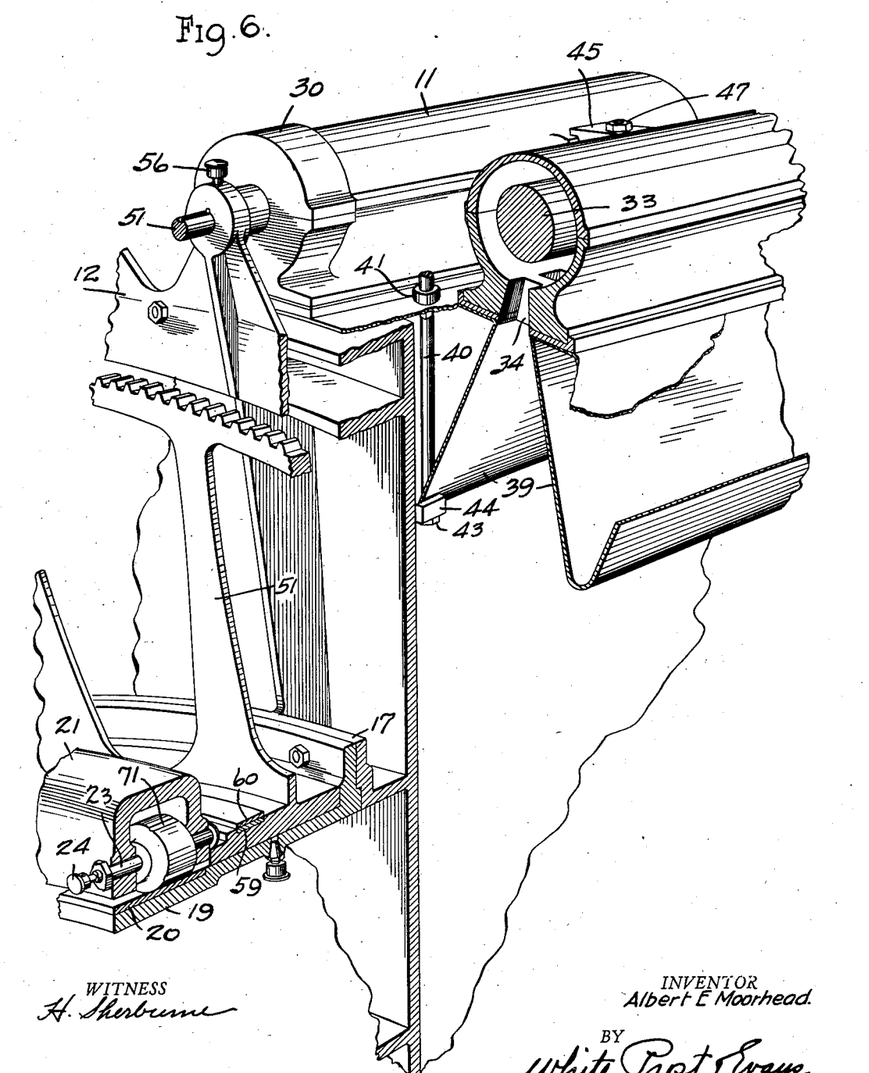
Fig. 6 is a perspective view of a portion of the apparatus, showing more clearly how the molds are assembled and rotated.

The plastic material that fills the molds may be conveniently introduced into the interior of the drum 12, by way of either of the hollow journal supports 18 or 19. From the drum the material finds its way into the molds 11 by way of apertures 34 in the cylinder 15, connecting with apertures through the guides 26 and the lower halves of the molds 11. A practicable means for feeding the material to a pipe mold at the side is thus produced. As the drum 12 rotates, the plastic material is forced through these apertures by centrifugal force, and the molds 11 are gradually filled up. Since the material is constantly subjected to a centrifugal force during molding, the excess moisture is forced out and good density of the product is produced. In order to produce a line of partition between the material within the mold and that within the drum, a slidable member 35 is provided for each mold, arranged in a longitudinal slot therein. In the position shown in Fig. 1, these slidable members have their apertures alining with those in the drum and mold, and thus permit the molds to fill up. After this is accomplished these members may be slid so as to interrupt the continuity of the apertures, and thus to form a line of cleavage. For conveniently sliding these members 35, I may provide a cam 36 attached to a handle 37 pivoted at 38 to a stationary part of the apparatus, as shown most clearly in Fig. 5. This cam is so located that when active, it is in the path of the projecting ends of members 35, as the drum is revolved. The active position of the cam surface is shown by the dot and dash line in Fig. 1. This cam during the process of pouring is in the position shown in Fig. 1, so as to be inactive, but may be rotated into the active position by the handle 37. This is done after the molds 11 are all full, and the drum 12 is then rotated for at least another revolution.

It may be advisable to guide the plastic material gradually to the apertures 34, as by means of hoppers. Especially is this desirable where a wet mixture is used. To provide these hoppers, I have shown the V-shaped ridges 39 (Fig. 2) extending substantially the full length of the drum 12, and so placed in the interior of the drum between the longitudinal series of apertures 34 that their base lines coincide with the edges of these apertures. The result is the formation of valleys or hoppers leading with a gradual slope to apertures 34. The ridges 39 are preferably made hollow, from sheet metal, so as to economize on weight. Means for holding these ridges to the internal surface of the drum may also serve conveniently as the means for securing the molds 11 to the external surface. For this purpose the stud bolts 40 may be utilized; these bolts are shown as threaded at both ends, and have a squared portion 41 which, fitting into a squared aperture in the drum, prevents them from turning. These bolts pass through the top of the ridges 39. A flange or boss 42 on each bolt rests against the outer surface of the drum, and permits these bolts to be drawn up tight by the nuts 43. The filler pieces 44 are placed between these nuts and the tops of the ridges so as to give these nuts a good clamping surface.

The outer ends of the bolts 40 carry the crowfeet 45 which slip in between adjacent molds 11, but may be turned so as to clamp the lower halves of the molds tightly against the drum 12. External handles 46 may be provided for manually turning these crowfeet. By turning the nuts 47, these crowfeet may be loosened or tightened as desired.

To increase the effect of centrifugal force, and also to impart a smooth inner surface to the pipe, I provide means for rotating the core 33, especially while the plastic material is still in its initial stages of setting. The rotation of the core causes that portion of the material which is carried around with it to be subjected to a further centrifugal force about the axis of the core. It may thus be said that the material is subjected to a combination of centrifugal forces; one due to the rotation of the drum itself and the other due to the rotation of the core. This material thus has a compound plantary motion, producing a compound centrifugal force.

To perform the rotation of the core most expeditiously, it is rotatably mounted within the mold 11, as by means of the journals 48 and 49. A pinion 50 for each core is mounted securely, as by a key, on a shaft 51 supported in a bearing in the circular casting 52. This casting forms a support for all of the twenty gear shafts 51, and is securely fastened as by bolts 53 to the head 13. Thus, these pinions are made to describe a planetary motion when the drum 12 rotates. A flange 54 on the shaft 51 serves to prevent axial movement of this shaft relative to its bearing. The shaft also has a squared aperture 55 at the end adjacent the end of the core 33, which carries a corresponding squared end which fits into this aperture 55. It is thus possible to remove the mold 11 when necessary and its core 33 from the drum without disturbing the shaft 51, and furthermore, this shaft 51 serves to transmit the rotation of pinion 50 to the core 33. Oil or grease cups 56 may also be provided to lubricate the shafts 51.

To rotate the pinions 50 when so desired, there is provided a large spur gear 57 meshing with all of them. This gear has its axis coincident with that of the drum 12, and it is evident that if it be held against rotation, the planetary motion of the pinions 50 would cause them to roll on the surface of the large gear 57, and they would thus rotate about their own axes. If, however, the gear 57 be rotated at the same speed as the drum 12, then there would be no relative rolling between the pinions and the gear 57 and thus there would be no rotation of these pinions about their own shafts.

To control conveniently the rotation of the gear 57, it is mounted on the outside of the journal support 19. This mounting is of such a nature that the friction between the inner surface of the hub 58 and the outer surface of the journal support 19 is great enough ordinarily to cause the gear 57 to be carried around with this support 19 as the drum is rotated. However, means are provided for holding the gear stationary or for permitting it to rotate at speeds between standstill and that of the drum, when so desired. In the present instance this includes a braking surface 59 fastened to the outside diameter of the hub 58, and a cooperating brake band 60 which may be manually tightened with the aid of a hand wheel 61. The brake 59 and band 60 may be of metal such as steel. One end 62 of the brake band is anchored to a stationary portion of the apparatus, by means of the eye 63. The other end is attached by means of eye 64 to an eye bolt 65 which has a squared portion 66 adapted to slide in a square aperture in the boss 67 supporting the standard 68. In this standard the hub 69 of the wheel 61 is journaled. The lower end of this hub has a tapped hole 70 which engages with the threads on bolt 65. By turning this hand wheel, it is possible to regulate the amount of friction between the band 60 and brake 59, and thus to regulate its speed. The hand wheel is operated right after the material is introduced into the drum 12. It is then turned just sufficiently to tighten the band 60 enough to start the cores rotating. However, the rotation of the cores will be intermittent at the start and will later cease entirely, since as the material will start to set, there will be considerable resistance offered by it to the rotation of the core. This resistance may be sufficient to stop it, at times, and this will occur when the resistance to the rotation of the mold is greater than the resistance to the rotation of the gear 57 upon the journal 19, due to the friction produced by the brake and band.

I have found that if the entire drum be vibrated during the process of pouring, the homogeneity and density of the product are improved substantially. To effect this result in a simple manner, at least one of the rollers 22 supporting the drum and forming a bearing for it is provided with slight indentations 71 on the periphery. Preferably several of the rollers are so provided. As these indentations coincide with the outer surface of journals 20 quite frequently, a fairly rapid vibration of the drum is obtained, and this vibration affects the plastic material after entering the molds 11. Furthermore, an added rapid vibration is produced by the action of the brake band 60 on the brake 59, while the gear 57 is carried around against the friction of the brake as described heretofore. This vibration may also be increased by leaving the teeth on the gears rough. This is of particular advantage in causing the core 33 to be vibrated, as by leaving the teeth on gear 57 and pinions 50 in such a condition.

The operation of the device may now be made plain. First, it is seen that the crowfeet 45 are properly in place and tightened so as to hold the molds 11 securely. The slides 35 are pulled out so as to open the molds. The drum may now be rotated by means of the gear 25, and the wet concrete poured into the interior of the drum through either or both of the hollow journal supports 18 and 19. The band 60 is now tightened just sufficiently to cause rotation of the cores 33 intermittently. The rotation of the plastic material and of the cores causes centrifugal force to act upon the material. It is forced between the ridges 39 through the apertures 34 into the molds 11. This force is sufficient to make the material homogeneous and dense, especially in view of the vibration of the drum which serves to agitate this material as it is forced into the molds. In a short time the material sets sufficiently during the process of pouring to stop the cores from rotating. After the molds 11 have all been filled, the handle 37 is rotated so as to cause the cam 36 to slide the members 35 inwardly and thus to close the apertures 34. The drum 12 is stopped, and the crowfeet 45 loosened set by set and the molds 11 taken off one at a time. In many instances it is not necessary to remove the entire mold; the top portion only need be removed by loosening the bolts 32, and the article molded may be supported only on the core 33. This is possible due to the high density produced by the combined action of the centrifugal force and the vibration, which eliminates a large amount of surplus moisture. The water, being lighter than the remaining ingredients of the mixture, is forced back by them toward the center of the drum. Also, since the material may constantly be introduced to the hoppers there is always a sufficient supply of material and defective molding is prevented. For handling the articles molded conveniently the eyes 72 are provided at the projecting end of cores 33, with which eyes appropriate crane hooks may engage. There is sufficient clearance however, between the squared end of the shaft of core 33 and the squared aperture 55 in the shaft 51 so that the entire mold 11 may be readily lifted clear of the ribs 29 on the guides 26, if so desired. The articles are carried to an appropriate drying kiln or yard, where the molds (or the cores only) may be removed after the plastic material has set sufficiently. The drum 12, however, may be supplied with empty molds as soon as one set is filled. In this way one drum can be used to pour a large number of molds, since it can be worked without interruption for the entire day.

I claim:

1. The method of molding articles of plastic material in a mold formed to enclose the article substantially completely, which consists in causing the mold to describe a planetary motion, and supplying the material to an opening in the mold where the centrifugal force causes the material to pass through the opening into the mold.

2. The method of molding articles of plastic material in a mold formed to enclose the article substantially completely, which consists in subjecting the material to the influence of a centrifugal force in such a way that it is urged through an opening in the mold.

3. The method of molding articles of plastic material in a mold, which consists in subjecting the material to the influence of a centrifugal force in such a way that it is urged through an opening in the mold, and simultaneously causing this material to be brought into a vibratory agitation.

4. The method of molding articles of plastic material in a mold, which consists in causing the mold to describe a planetary motion, supplying the material to an opening in the mold where the centrifugal force causes the material to pass through the opening into the mold, and simultaneously causing the material to be brought into a vibratory agitation.

5. The method of molding articles of plastic material in a mold utilizing a core of circular cross section which consists in causing the mold to describe a planetary motion, supplying the material to an opening in the mold where the centrifugal force causes the material to pass through the opening into the mold, and causing relative rotation of the core and the mold about the axis of the core while the mold is filled.

6. The method of molding articles of plastic material in a mold utilizing a core of circular cross section which consists in subjecting the material to the influence of a centrifugal force in such a way that it is urged through an opening in the mold, and causing relative rotation of the core and the mold about the axis of the core while the mold is filled.

7. The method of molding articles of plastic material in a mold utilizing a core of circular cross section which consists in subjecting the material to the influence of a centrifugal force in such a way that it is urged through an opening in the mold, simultaneously causing this material to be brought into a vibratory agitation, and causing relative rotation of the core and the mold about the axis of the core while the mold is filled.

8. The method of molding articles of plastic material in a mold utilizing a core of circular cross section which consists in causing the mold to describe a planetary motion, supplying the material to an opening in the mold where the centrifugal force causes the material to pass through the opening into the mold, simultaneously causing the material to be brought into a vibratory agitation, and causing relative rotation of the core and of the mold about the axis of the core while the mold is filled.

9. In a machine for molding articles from plastic material, a mold formed to enclose the article substantially completely and having a filling aperture, and means for imparting a planetary motion to the mold, whereby material deposited near the aperture will enter the mold under the influence of centrifugal force.

10. In a machine for molding articles from plastic material, a mold formed to enclose the article substantially entirely and having a filling aperture, means for imparting a planetary motion to the mold, and a hopper rotatable with the mold connecting with the aperture, whereby material deposited near the aperture will enter the mold under the influence of centrifugal force.

11. In a machine for molding articles from plastic material, a mold formed to enclose the article substantially entirely and having an aperture, and means for urging the material through the aperture under the influence of centrifugal force.

12. In a machine for molding articles from plastic material, a mold having an aperture, means for urging the material through the aperture under the influence of centrifugal force, and means for vibrating this material while it is being urged into the mold.

13. In a machine for molding articles from plastic material, a mold having an aperture, a drum upon which the mold is carried, the aperture opening into the drum, means for supplying the material to the drum, and means for rotating the drum and for setting up vibrations in the drum.

14. In a machine for molding articles from plastic material, a mold having an aperture, a drum upon which the mold is carried, the aperture opening into the drum, a hopper connecting with the aperture carried on the inside of the drum, and means for rotating the drum.

15. In a machine for molding articles from plastic material, a mold having an aperture, a drum upon which the mold is carried, the aperture opening into the drum, a hopper connecting with the aperture carried on the inside of the drum, and means for rotating the drum and for setting up vibrations in the drum.

16. In a machine for molding articles from plastic material, a mold having an aperture, a drum upon which the mold is carried, the aperture opening into the drum, a hopper connecting with the aperture carried on the inside of the drum, and rollers upon which the drum is mounted for rotation, at least some of the rollers having a slightly irregular surface to produce vibration of the drum.

17. In a machine for molding articles from plastic material, a mold having an aperture, a core of circular cross section within the mold, means for imparting a planetary motion to the mold about a stationary axis, and means for causing relative rotation of the core and mold about the axis of the core whereby plastic material placed near the aperture will enter the mold under the influence of centrifugal force.

18. In a machine for molding articles from plastic material, a mold having an aperture, a core of circular cross section within the mold, means for imparting a planetary motion to the mold about a stationary axis, a hopper rotatable with the mold connecting with the aperture, and means for causing relative rotation of the core and mold about the axis of the core.

19. In a machine for molding articles from plastic material, a mold having an aperture, a core of circular cross section within the mold, means for urging the material through the aperture under the influence of centrifugal force, and means for causing relative rotation of the core and mold about the axis of the core.

20. In a machine for molding articles from plastic material, a mold having an aperture, a core of circular cross section within the mold, means for urging the material through the aperture under the influence of centrifugal force, means for vibrating this material while it is being poured into the mold, and means for causing relative rotation of the core and mold about the axis of the core.

21. In a machine for molding articles from plastic material, a mold having an aperture, a core of circular cross section within the mold, a drum upon which the mold is carried, the aperture opening into the drum, means for rotating the drum and for setting up vibrations in the drum, and means for causing relative rotation of the core and mold about the axis of the core.

22. In a machine for molding articles from plastic material, a mold having an aperture, a core of circular cross section within the mold, a drum upon which the mold is carried, the aperture opening into the drum, a hopper connecting with the aperture carried on the inside of the drum, means for rotating the drum, and means for rotating the core about its own axis.

23. In a machine for molding articles from plastic material, a mold having an aperture, a core of circular cross section within the mold, a drum upon which the mold is carried, the aperture opening into the drum, a hopper connecting with the aperture carried on the inside of the drum, means for rotating the drum and for setting up vibrations in the drum, and means for rotating the core about its own axis.

24. In a machine for molding articles from plastic material, a mold having an aperture, a core of circular cross section within the mold, a drum upon which the mold is carried, the aperture opening into the drum, a hopper connecting with the aperture carried on the inside of the drum, rollers upon which the drum is mounted for rotation, at least some of the rollers having a slightly irregular surface to produce vibration of the drum, and means for rotating the core about its own axis.

25. In a machine for molding articles from plastic material, a rotatably mounted drum, means for rotating the drum, a plurality of molds carried on the exterior of the drum, said molds having apertures opening within the drum, and a series of ridges so disposed on the interior of the drum as to form guides or hoppers to the apertures.

26. In a machine for molding articles from plastic material, a rotatably mounted drum, means for rotating the drum, a plurality of molds carried on the exterior of the drum, said molds having apertures opening within the drum, and slides arranged to open or close the apertures.

27. In a machine for molding articles from plastic material, a rotatably mounted drum, means for rotating the drum, a plurality of molds carried on the exterior of the drum, said molds having apertures opening within the drum, a slide for each mold arranged to open or close the apertures, and stationary means operating the slides as the drum rotates.

28. In a machine for molding articles from plastic material, a rotatably mounted drum, a plurality of molds carried on the exterior of the drum, said molds having apertures opening within the drum, a slide for each mold arranged to open or close the apertures, and means rendered active manually to operate the slides as the drum rotates.

29. In a machine for molding articles from plastic material, a rotatably mounted drum, a plurality of molds carried on the exterior of the drum, said molds having apertures opening within the drum, a slide for each mold arranged to open or close the apertures, a cam coacting with the slides to operate them as the drum rotates, and means for rendering the cam active or inactive.

30. In a machine for molding articles from plastic material, a rotatably mounted drum, a mold carried on the exterior of the drum, said mold having an aperture opening within the drum, a core rotatable about its own axis within the mold, means for rotating the core, and means for controlling the rate of rotation of the core.

31. In a machine for molding articles from plastic material, a rotatably mounted drum, a mold carried on the exterior of the drum, said mold having an aperture opening within the drum, a core rotatable about its own axis within the mold, a pinion for rotating the core, a gear meshing with the pinion, and means for controlling the movement of the gear.

32. In a machine for molding articles from plastic material, a rotatably mounted drum, a mold carried on the exterior of the drum, said mold having an aperture opening within the drum, a core rotatable about its own axis within the mold, a means for rotating the drum, a pinion for rotating the core, a gear in frictional engagement with a portion of the drum and meshing with the pinion, and means for causing the gear to have rotation relative to the drum.

33. In a machine for molding articles from plastic material, a rotatably mounted drum, a mold carried on the exterior of the drum, said mold having an aperture opening within the drum, a core rotatable about its own axis within the mold, means for rotating the drum, a pinion for rotating the core, a gear in frictional engagement with a portion of the drum and meshing with the pinion, the axis of the gear coinciding with the axis of the drum, and an adjustable brake band around the hub of the gear for controlling its rotation.

34. In a machine for molding articles from plastic material, a rotatably mounted drum, a plurality of molds carried on the exterior of the drum, said molds having apertures opening within the drum, cores rotatable about their own axis within the molds, a pinion for each core, a gear in frictional engagement with a portion of the drum and meshing with all of the pinions, the axis of the gear coinciding with the axis of the drum, and an adjustable brake band around the hub of the gear for controlling its rotation.

35. In a machine for molding articles from plastic material, a drum, and a plurality of molds carried on the exterior of the drum, each of said molds being formed to enclose the article molded substantially completely.

36. In a machine for molding articles from plastic material, a rotatably mounted drum, and a plurality of molds carried by the drum, each of said molds being formed to enclose the article molded substantially completely.

37. A mold for casting hollow pipe from plastic material, having a core and a wall substantially entirely surrounding the core, characterized by the fact that means are provided for urging the material into the mold on the side thereof, and for distributing the material within the mold.

38. The method of molding an article from plastic material in a mold surrounding the article substantially entirely so as to fill the mold completely which consists in subjecting the material in the course of molding to a centrifugal force.

39. The method of molding an article from plastic material in a mold, so as to fill the mold completely which consists in subjecting the plastic material during the process of molding to a centrifugal force due to a planetary motion about a stationary axis, and to a centrifugal force due to a rotation about an axis within the mold.

40. The method of molding an article from plastic material in a mold which consists in subjecting the material during the process of molding to a compound centrifugal force.

41. The method of molding an article from plastic material in a mold which consists in subjecting the material during the process of molding to a compound centrifugal force and to vibration.

42. In a machine for molding articles from plastic material, means for imparting a planetary motion to the material, and means for imparting a further rotary motion to the material during the process of molding.

43. In a machine for molding articles from plastic material, means for imparting a compound planetary motion to the material during the process of molding.

44. In a machine for molding articles from plastic material, means for imparting a compound planetary motion to the material, and means for vibrating the material during the process of molding.

45. In a mold and a core for casting hollow pipe from plastic material, means for urging the plastic material through an aperture in the side of the mold, and for distributing the material uniformly within it.

46. In a mold and core for casting hollow pipe from plastic material, the mold having an aperture at the side, means for causing the plastic material to enter this aperture under the influence of centrifugal force, whereby a good distribution of the material is obtained within the mold.

47. In a mold and core for casting hollow pipe from plastic material, the mold having an aperture at the side, means for causing the plastic material to enter this aperture under the influence of centrifugal force, and means for vibrating the mold and core, whereby a good distribution of the material is obtained within the mold.

48. In a mold and core for casting hollow pipe from plastic material, the mold having an aperture at the side, means for causing the plastic material to enter this aperture under the influence of centrifugal force, and means for rotating the core, whereby a good distribution of the material is obtained within the mold.

49. In a machine for molding pipe sections, a drum and a plurality of detachable pipe molds disposed exteriorly of the drum on its periphery.

50. In a machine for molding pipe sections, a rotatable drum, a pipe mold having its axis parallel with that of the drum, and supported on its exterior periphery and means for supplying material to the mold from the interior of the drum and through its periphery.

51. In a molding machine, a rotatable drum, a mold, exteriorly supported thereon and means for supplying material to the mold from the interior of the drum and through its periphery.

In testimony whereof, I have hereunto set my hand.

ALBERT E. MOORHEAD.